United States Patent

Caputi et al.

[15] 3,662,178
[45] May 9, 1972

[54] TRACK-REGISTRATION PROCESS

[72] Inventors: Roger W. Caputi, Walnut Creek; Wayne T. Crawford, Pleasanton, both of Calif.

[73] Assignee: General Electric Company

[22] Filed: Feb. 9, 1970

[21] Appl. No.: 9,818

[52] U.S. Cl. ..........................250/83 CD, 250/83 PH, 156/2
[51] Int. Cl. ..........................................................G01t 5/00
[58] Field of Search ................................250/83 CD, 83 PH

[56] References Cited

UNITED STATES PATENTS

| 3,501,636 | 3/1970 | Sherwood | 259/83 CD |
| 3,505,523 | 4/1970 | Becker | 250/83 CD |

*Primary Examiner*—James W. Lawrence
*Assistant Examiner*—Davis L. Willis
*Attorney*—Ivor J. James, Jr., Samuel E. Turner, Sam E. Laub, Frank L. Neuhauser, Oscar B. Waddell and Joseph B. Forman

[57] ABSTRACT

A pre-etching treatment of a track-registration film wherein the irradiated film is exposed to ultra-violet radiation immersed in oxygenated water whereby the damage tracks are sensitized while annealing of the damage tracks is prevented.

16 Claims, 4 Drawing Figures

INVENTORS:
ROGER W. CAPUTI
WAYNE T. CRAWFORD

TRACK-REGISTRATION PROCESS

BACKGROUND

A known technique for making visible the damage tracks formed in a body by energetic particles is described by Price et al. in U.S. Pat. No. 3,303,085 and by R. L. Fleischer et al. in an article entitled "Tracks of Charged Particles in Solids," Science, July 23, 1965, Vol. 149, No. 3682.

This particle track-registration process uses a body which may be a crystalline solid such as mica or a non-crystalline material such as inorganic glass or an organic polymeric plastic. When the body is irradiated with energetic particles, such as alpha particles or fission fragments, damage tracks are formed in the material by local alteration of the structure of the material along the paths of the particles. The damage tracks are made visible by subjecting the body to a solvent which preferentially attacks the altered material along the damage tracks. Individual tracks are visible under an optical microscope after this "etching" treatment. Prior to etching, the tracks are generally not detectable.

A wide variety of commercial applications have been discovered for these particle track-registration processes and materials. For example, where the irradiated body is in the form of a thin sheet or film, the holes will pass entirely through the sheet, the individual holes having diameters in the range of 5–100,000 angstroms. The perforated sheets thus formed have utility as membrane filters, as described in U.S. Pat. No. 3,303,085. These techniques and materials have also been found useful in neutron radiography, as described in copending U.S. Pat. application Ser. Nos. 558,490, now U.S. Pat. No. 3,493,741 (filed June 17, 1966) and 601,112, now U.S. Pat. No. 3,457,408 (filed Dec. 12, 1966).

While the present particle track-registration techniques give excellent results, further improvements are desirable. In the production of filters, for example, it is highly desirable that the holes or perforations (often called "pores") be substantially cylindrical in shape. If the perforations are relatively wide at the sheet surface and narrow near the center of the sheet, particles in the solution being filtered may clog the filter by partially entering the perforation and jamming at the narrow zone. Where the etching solvent attacks the body of the sheet and the damage tracks at about the same rate, the resulting perforations will have this undesirable non-cylindrical shape. Thus, it is of the highest importance that the etchant selectively dissolve the altered material along the damage tracks at a much higher rate than it dissolves the body of the sheet. Also, it is important for rapid commercial production of filter materials that the etchant dissolve the altered materials at a high rate so that filters of very small pore size may be produced.

A method of increasing the etching rate of the damage tracks with respect to the etching rate of the bulk material is described by W. T. Crawford et al. in copending U.S. Pat. application Ser. No. 812,463 (filed Apr. 1, 1969) now U.S. Pat. No. 3,612,871 wherein, after irradiation with energetic particles but before etching, the material is subjected to radiation of wave lengths less than about 4,000 angstroms or with electrons in the presence of oxygen. However, well-known sources of ultra-violet radiation also produce significant amounts of infrared radiation. Thus, if this pre-etch treatment is performed in a gaseous atmosphere without infrared filtering, it is found that the sheet material is unduly heated whereby the damage tracks tend to disappear because of annealing.

SUMMARY

It is an object of the invention to provide pre-etch radiation treatment of track-registration material without undue heating or annealing of the material.

This and other objects are achieved in accordance with the invention by exposing the irradiated track-registration material to ultra-violet radiation while the material is submerged in a liquid coolant containing oxygen such as aerated or oxygenated water or a hydrogen peroxide solution. The liquid coolant acts both as an infrared filter and as an effective heat sink, thus preventing overheating and resultant thermal damage to the track-registration material. Also, it is found that by this means the length of ultra-violet exposure can be reduced to less than one-third the length of exposure required in a gaseous oxygen-containing atmosphere. Furthermore, the need for expensive infrared filters is eliminated.

DRAWING

The invention is described in greater detail hereinafter with reference to the accompanying drawing, wherein.

DETAILED DESCRIPTION

Figure 1:
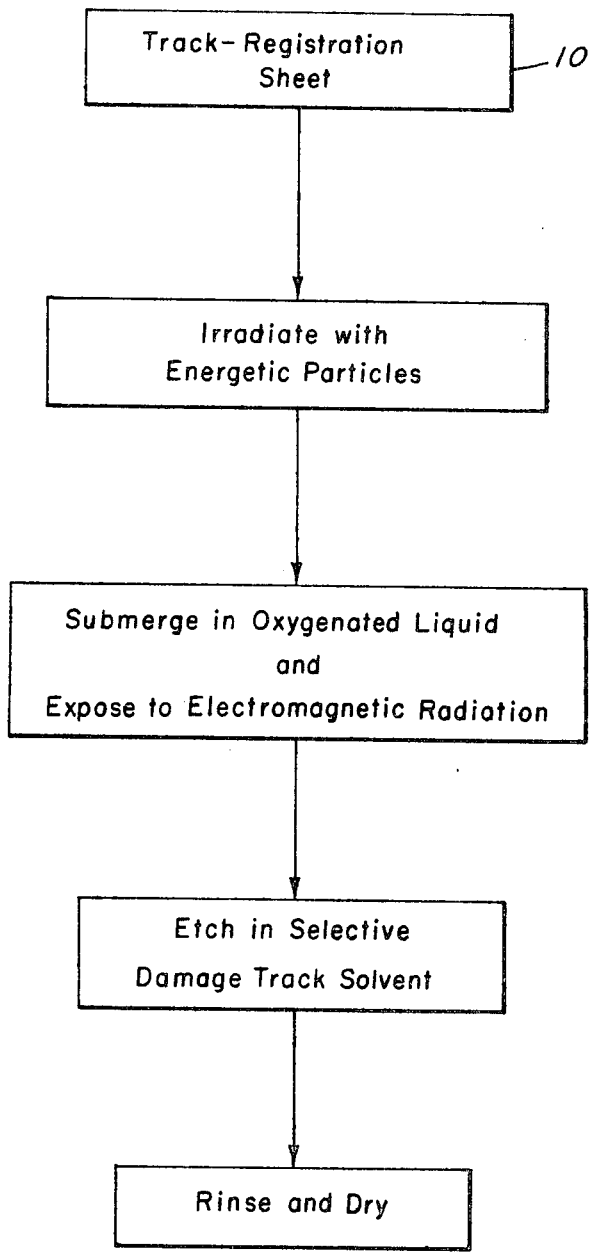
FIG. 1 is a flow diagram of a preferred track-registration process according to the invention.

Shown in FIG. 1 is a flow diagram illustrating the steps in a preferred process according to this invention.

A sheet of track-registration material 10 is prepared or otherwise obtained. As is further detailed below, a wide variety of materials may be used. Optimum materials for a given set of circumstances may be selected, depending on handling conditions, type of particles to be registered, etc.

The sheet of track-registration material is irradiated with energetic particles to form damage tracks comprising altered material along the particle paths or trajectories in the material.

Figure 2:
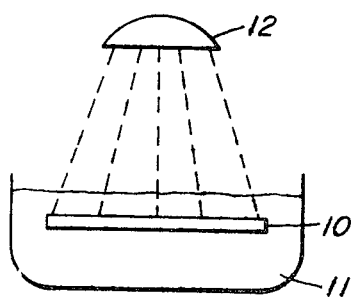
FIG. 2 is a schematic illustration of an electromagnetic treatment arrangement.

The irradiated track-registration material 10 is then submerged in an oxygen-containing liquid 11 as shown in FIG. 2. The liquid 11 may be, for example, aerated or oxygenated water or a hydrogen peroxide solution. The material 10 is submerged in liquid 11 about 1 cm., for example, with the surface of the material parallel to the surface of the liquid.

Next, the submerged irradiated material is exposed to electromagnetic radiation of wavelengths less than about 4,000 angstroms, preferably and conveniently middle, near ultraviolet and/or ultra-violet light, as from an ultra-violet light source 12 which may be an H3T7 mercury vapor lamp available from the General Electric Company. The lamp is preferably mounted in a parabolic reflector and may be spaced from the surface of the liquid in the order of 12 cm. The liquid 11 acts as an infrared filter and as a heat sink to thus prevent thermal damage of the material. As is further discussed below, while the mechanism is not fully understood, this treatment permits much more rapid selective etching of the altered material along the damage tracks than is the case where this treatment is omitted. In addition, etched tracks formed after this treatment tend to be much more uniformly cylindrical in shape. Where this treatment is omitted, good etched tracks may be obtainable only with extensive etching and the etched tracks tend to be conical, being wider at the material surface.

Next, the exposed, irradiated material is subjected to an etching solution which selectively attacks and dissolves the altered material along the tracks and enlarges the damage tracks to the desired diameter. As is further described below, a wide variety of etching solutions and conditions may be used, where suitable. While these solutions do attack the body of the track-registration material, they attack the altered material along the damage tracks at a much greater rate.

Finally, the material is removed from the etching solution, rinsed (generally with water), and dried.

The sheet is now ready for the intended ultimate use.

Figure 3:
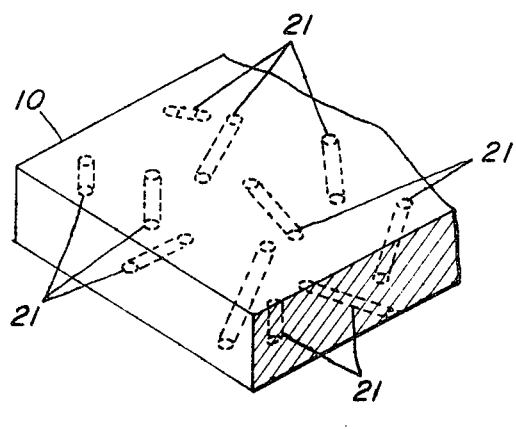
FIG. 3 is an enlarged schematic illustration of a portion of a track-registration sheet after irradiation with energetic particles.
Figure 4:
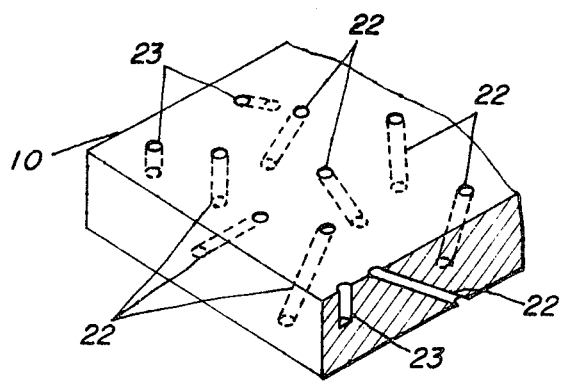
FIG. 4 is an enlarged schematic illustration of the sheet of FIG. 3 after treatment with the selective etching solution.

FIG. 3 and 4 schematically show the track-registration material after irradiation with energetic particles and after etching, respectively.

As seen in FIG. 3, the track-registration material 10 contains a plurality of substantially invisible damage tracks 21 caused by the passage of energetic particles. As illustrated, the particles entered the material at a variety of angles. Of course, the particles may be collimated, if desired, so that all enter at substantially the same angle. At this time the tracks are substantially invisible.

FIG. 4 shows material 10 after the treatment with the radiation described above in the presence of oxygen and after etching. Holes entirely through the material, as at 22, are formed where high energy particles passed entirely through the material. Lower energy particles result in substantially cylindrical pits such as those at 23.

Any suitable synthetic resins may be treated in the process of this invention. Typical synthetic resins include: polyester resins such as polycarbonates, polyethylene terephthalate; cellulosics such as cellulose nitrate, and cellulose acetate; and mixtures thereof. Where the track-forming energetic particles are alpha particles, the cellulosics are preferred, while polycarbonates are preferred where the tracks are formed by relatively heavy fission fragments.

Any suitable source of energetic particles may be used. Typical sources include self-fissioning isotopes such as californium-252; isotopes which decay by the emission of alpha particles, such as radium-226, and americium-241; materials such as uranium-235 which fission and emit fission fragments when irradiated with neutrons; materials such as boron-10 which emit alpha particles when irradiated with neutrons; and various atomic and sub-atomic particle accelerators.

Any suitable etchant may be used to enlarge the damage tracks to the desired diameter. The etchant may be an aqueous or non-aqueous solution of acidic or basic catalysts or redox agents, where suitable. Typical etchants include sodium hydroxide, potassium hydroxide, lithium hydroxide, chromic acid, potassium permanganate, ammonium hydroxide, potassium t-butoxide, tetrapropyl ammonium hydroxide, and mixtures thereof. While any suitable solution concentrations may be used, a concentrated solution is generally preferred for more rapid track enlargement. Similarly, while the etching solution may be used at any suitable temperature, it is generally preferable to heat (but not boil) the solution to increase the rate of track enlargement. Good results are obtained for polycarbonate, for example, with about 6-normal solution of sodium hydroxide at about 80° C., with stirring or agitation of the solution during treatment. Where small pore diameters are desired or to allow sufficient etching time for adequate quality control, a lower temperature may be desirable.

The sheet may be treated with the etching solution for any suitable time period. Where the period is too short, the tracks may not have a sufficient diameter for the intended use, while too long a treating period may allow the solution to attack the body of the sheet excessively. The optimum time period will vary, of course, depending upon the sheet material, the etchant; desired pore size and the solution concentration and temperature. Typically, with a polycarbonate sheet, developed in a 6-normal sodium hydroxide at about 60° C., about 20 minutes in the solution produces fully developed tracks having a diameter of about 0.5 microns.

As is further pointed out in the examples below, treating the particle irradiated sheet with electromagnetic radiation, for example ultra-violet light, while the sheet is submerged in an oxygen-containing liquid in accordance with the invention is found to preferentially greatly increase the etching rate of the altered material along the particle damage tracks in the material while the etching rate of the bulk material does not significantly increase.

The pores formed by etching the treated sheets have been found to be substantially cylindrical while those formed in untreated sheets often are somewhat conical, being wider at the sheet's surface. Also, it has been found that pores having smaller initial diameters may be produced in the treated sheet. While it is not fully understood why this dramatic improvement results from this intermediate treatment, it is thought that the underlying processes are related to photochemical reactions which involve a radical species in the altered material and oxidation reactions thereof.

The invention is further illustrated by the following examples:

EXAMPLE I

Irradiated polycarbonate material was exposed in air to the radiation from an H3T7 mercury vapor lamp at a distance 25 cm. for 4 minutes. No infrared filter was used. When etched in 6M NaOH at 80° C., it was very apparent that bulk degradation of the polycarbonate had taken place to a depth of about 5 microns. Tracks were evident in the undamaged portion of the material.

A control sample, which was not exposed to the radiation, but which was similarly etched exhibited no pores.

A third sample was submerged in an oxygen-containing liquid (in this example, plain tap water) and therein exposed to radiation from the mercury vapor lamp for 3 minutes. After subsequent etching in 6M NaOH at 60° C. for 8 minutes, this sample contained pores 16.6 microns in length.

EXAMPLE II

An irradiated polycarbonate sample was divided into three portions. The first portion was etched in 6M NaOH at 60° C. for 8 minutes immediately after irradiation and without exposure to ultra-violet radiation. No pores were evident.

A second portion was submerged in oxygen saturated water and exposed to ultra-violet radiation (as shown in FIG. 1) for 3 minutes. After a similar etching treatment, pores having a length of 19 microns were found.

A third portion received a 3 minute ultra-violet exposure while submerged in partially degassed water. After a similar etching treatment, pores limited to a length of 14.5 microns were found.

EXAMPLE III

An irradiated polycarbonate sample was cut into several portions. Each portion was exposed to ultra-violet radiation for a different length of time while submerged in a 2% $H_2O_2$ solution. Track or pore lengths after etching in 6M NaOH at 60° C. for 8 minutes were as follows:

| Exposure Time (minutes) | Track Length (microns) |
| --- | --- |
| 3 | 19.1 |
| 1 | 16.6 |
| 0.5 | 10.5 |
| 0.25 | 6.7 |
| 0 | (no tracks) |

An additional portion was processed in a similar manner except that it was exposed to ultra-violet radiation for 3 minutes while submerged in a 10% $H_2O_2$ solution. Track length in this case was found to be 18.1 microns.

No bulk degradation of the polycarbonate material was found in the samples of examples II and III.

We claim:

1. In a track-registration process wherein a track-registration material is irradiated with energetic particles which form tracks of altered material along their trajectories in the material and the irradiated material is etched with a reagent which preferentially attacks the altered material along said tracks; the improvement wherein prior to etching said irradiated material is exposed to electromagnetic radiation having wavelengths less than about 4,000 angstroms while submerged in an oxygen-containing liquid.

2. The process according to claim 1 wherein said energetic particles are alpha particles and said track-registration material comprises cellulose materials.

3. The process according to claim 1 wherein said energetic particles are fission fragments and said track-registration material comprises a polycarbonate resin.

4. The process according to claim 1 wherein said electromagnetic radiation is ultra-violet radiation.

5. The process according to claim 4 wherein said ultra-violet radiation has wavelengths in the region from about 3,600 to about 3,800 angstroms.

6. The process according to claim 1 wherein said electromagnetic radiation is gamma radiation.

7. The process according to claim 1 wherein said electromagnetic radiation is X-radiation.

8. A track registration process comprising the steps of irradiating a track-registration material with energetic particles which form damage tracks along paths in said material traversed by said energetic particles; submerging said irradiated material in an oxygen-containing liquid coolant; and exposing the irradiated material to electromagnetic radiation having wavelengths less than about 4,000 angstroms.

9. The process according to claim 8 wherein said oxygen-containing liquid coolant is hydrogen peroxide.

10. The process according to claim 8 wherein said energetic particles are alpha particles and said track-registration material comprises cellulose materials.

11. The process according to claim 8 wherein said energetic particles are fission fragments and said track-registration material comprises a polycarbonate resin.

12. The process according to claim 11 wherein after exposure to said electromagnetic radiation said irradiated material is immersed in an etching solution comprising about 6-normal sodium hydroxide at a temperature of from about 50° C. to about 80° C. for about 5 to 20 minutes.

13. The process according to claim 8 wherein said electromagnetic radiation is ultra-violet radiation.

14. The process according to claim 13 wherein said ultra-violet radiation has wavelengths in the region from about 3,600 to about 3,800 angstroms.

15. The process according to claim 8 wherein said electromagnetic radiation is gamma radiation.

16. The process according to claim 8 wherein said electromagnetic radiation is X-radiation.

* * * * *

UNITED STATES PATENT OFFICE
CERTIFICATE OF CORRECTION

Patent No. 3,662,178　　　　　　　　　　Dated May 9, 1972

Inventor(s) Roger W. Caputi and Wayne T. Crawford

It is certified that error appears in the above-identified patent and that said Letters Patent are hereby corrected as shown below:

Abstract, line 2, after "radiation" insert --while--. Column 3, line 57, after "etchant", the semi-colon should be a comma. Column 5, line 12, after "said" insert --irradiated--.

Signed and sealed this 3rd day of October 1972.

(SEAL)
Attest:

EDWARD M. FLETCHER, JR.　　　　　　　　ROBERT GOTTSCHALK
Attesting Officer　　　　　　　　　　　Commissioner of Patents